(No Model.)
W. P. BROWN.
WHEEL CULTIVATOR.
No. 372,399. Patented Nov. 1, 1887.
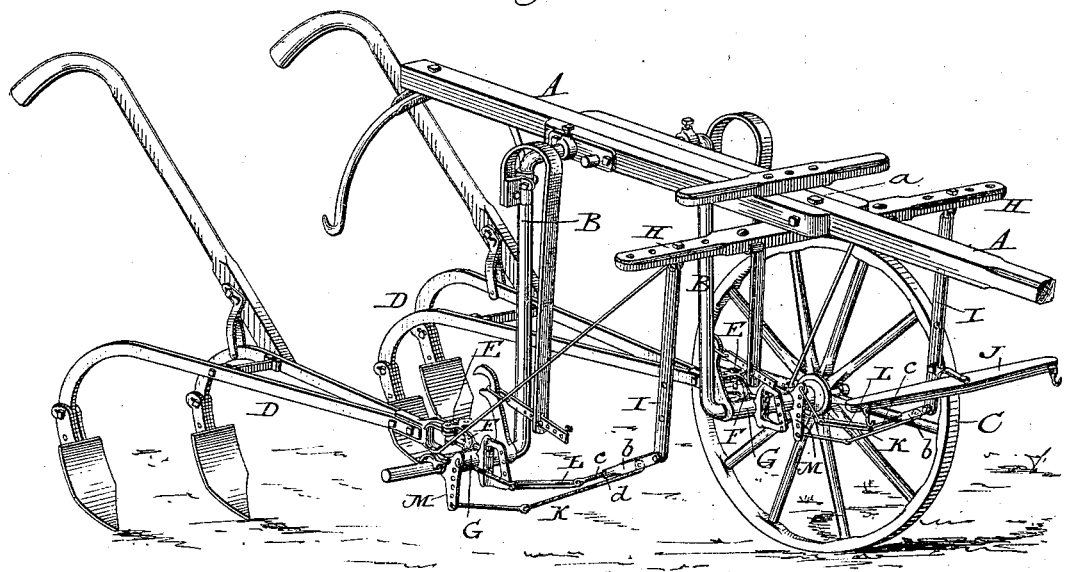
Fig. 1.
Fig. 2.
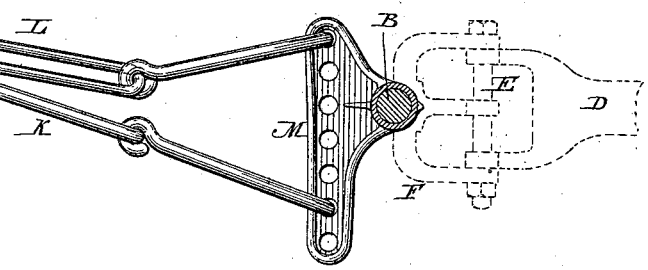
Attest:
Sidney P. Hollingsworth
N. R. Kennedy
Inventor:
W. P. Brown,
By his Atty.
P. Y. Dodge.

UNITED STATES PATENT OFFICE.

WILLIAM P. BROWN, OF ZANESVILLE, OHIO.

WHEEL-CULTIVATOR.

SPECIFICATION forming part of Letters Patent No. 372,399, dated November 1, 1887.

Application filed August 30, 1887. Serial No. 248,265. (No model.)

*To all whom it may concern:*

Be it known that I, WILLIAM P. BROWN, of Zanesville, in the county of Muskingum and State of Ohio, have invented certain Improvements in Wheeled Cultivators, of which the following is a specification.

My invention has reference to that class of wheeled cultivators in which two laterally and vertically movable drag bars or beams are jointed at their forward ends to opposite ends of an arched wheeled axle.

It has reference more especially to that class of machines in which the draft devices are connected to the beams or beam-couplings in such manner that the draft tends to force the plows into the ground, the draft commonly overcoming in this action the effect of the springs which tend to lift the beams out of action.

The aim of the present invention is more particularly to prevent the draft devices from forcing the plows too deeply into the soil, and thus to regulate the depth to which cultivation is effected; and to this end it consists in combining with the plows or couplings and the draft devices which tend to depress the plows secondary connections between the plows and draft devices to check the downward motion of the plows, and in providing the secondary connections with means of adjustment, by which they may be caused to act with the plows at one depth or another, as the nature of the soil or other circumstances may demand.

In the accompanying drawings, Figure 1 represents a perspective view of a plow having my improvements applied thereto. Fig. 2 is a detailed view of the draft devices, partly in section.

Referring to the drawings, A represents a draft pole or frame; B B, the two ends or sections of the arched axle attached at the middle to the draft-frame; C C, the two groundwheels mounted on the outer ends of the axle; D D, the two plows, connected at their forward ends by vertical pivots E, two draft-heads, F, which are secured rigidly but adjustably on sleeves or pipe-boxes G, loosely encircling the horizontal ends of the axle, the vertical axis E permitting the plows to swing laterally, while the rotation of the sleeve G about the axle permits the plows to swing vertically.

H represents a cross bar or evener connected at its middle by a pivot, a, to the draft-frame, and provided at each end with a depending arm or bar, I, jointed thereto, so that it may swing freely forward and backward. Each of these bars is provided with a singletree, J, for the connection of a draft-animal thereto, and is also connected at its lower end, by a jointed draft-rod, K, or equivalent connection, to the flange M on the pipe-box, or the draft-head F of the corresponding plow, so that the draft of each animal is communicated through the singletree, the arm I, and rod K, directly to the appropriate plow.

The draft-flange M is provided, as usual, with a series of holes at different heights, and the draft-rod K engages in one of these holes below the axle, so that the draft or power applied to propel the machine tends to turn the pipe-box G backward, and thereby throw the plows and shovels downward. In other words, the draft tends to force the plow into the ground, and this with greater or less effect, according to the height at which the rod K is engaged with the draft-flange.

The foregoing parts are constructed and operate in a manner well understood in the art and are not claimed as of the present invention. In order to prevent the draft-rod K from forcing the plows too deeply into the ground, I provide supplemental connections forming the subject of the present invention. In their preferred form, (represented in the drawings,) the connections consist on each side of the machine of a jointed rod, L, extending from the lower end of the arm I to the upper end of the flange or arm M on the pipe-box at a point above the axis of the box. The connection L remains inert until the plows reach the proper depth in the soil, at which time the connection coming into play opposes or resists the depressing action of the rod K and prevents the draft head or coupling from turning rearward. It will be perceived that the draft-rod K and the check-rod L act the former above and the latter below the horizontal axis on which the draft head or coupling revolves, the one counteracting the other when the plow is at the proper depth.

In order to regulate the depth to which the plows will enter the ground, I provide for the longitudinal adjustment of the check-rod L.

In the preferred construction (represented in the drawings) a forked plate, b, is connected by a horizontal pivot to the lower end of the bar I, and a threaded rod, c, forming part of the connection L, is screwed into the rear end of this plate, and secured by a check-nut, d. At its rear end the connection L is fashioned into a hook passed through the arm M. This hook may be disengaged and the rod lengthened or shortened by screwing it into or out of the plate b. As it is lengthened, it permits the plows to enter to a greater depth, and as it is shortened it limits their descent. The draft-rod K is in this instance connected by a pivot to the plate b.

While I prefer to connect the draft-rod K and check-rod L directly to the flange on the sleeve, which forms part of the plow head or coupling, it is to be understood that the rods may be attached one to the flange and the other to the draft-head F, or both attached to the latter, the action being the same in either case.

It will be perceived that the draft-head, the pipe-box, and the flange M are all parts of the plow head or coupling, and that they revolve together around the axle, so that it is immaterial, as regards the control of the plow, to which of these members the draft and check rods are attached, provided only the attachment is made at the proper points above and below the axle.

The essence of the invention resides in combining with the draft device, which tends to force the plow into the ground, a check device which is brought into play to limit the descent at the proper point.

Having thus described my invention, what I claim is—

1. In a cultivator, the combination of a wheeled frame, a plow jointed thereto to swing vertically, a draft device connected to said plow below its horizontal axis and tending to force the plow into the soil, and a check-rod connecting the draft device with the plow at a point above the horizontal axis, whereby said check device is enabled to counteract the depressing effect of the draft device and limit the descent of the plow at the proper point.

2. In a cultivator, a wheeled frame, a plow or cultivator proper connected at its forward end to said frame by a horizontal axis, that its rear end may swing vertically, a draft device connected with the cultivator below its horizontal axis, in order that the draft may force the plow into the soil, and an adjustable check device connecting the draft device with the plow at a point above its horizontal axis, whereby the plow is forced into the soil until the check device is brought into play and its descent then arrested.

3. In a cultivator, the combination of a draft-frame, its arched axle, the ground-wheels, the plows connected to sleeves turning upon the ends of the axle, the cross-bar or evener pivoted to the frame, the pendent bars at its ends, the draft devices extending from said bars to the plows at suitable points to urge the plows into the soil, and the check-rods extending from the draft devices to the plows at suitable points to limit their downward action.

4. In a cultivator, the wheeled frame, the sleeves mounted to revolve on its axle, the plows connected to said sleeves by vertical pivots, the evener H, arms I, draft-rods K, and check-rods L.

In testimony whereof I hereunto set my hand, this 25th day of June, 1887, in the presence of two attesting witnesses.

WILLIAM P. BROWN.

Witnesses:
C. W. FENSTEMAKER,
N. H. MOORE.